United States Patent
Wells et al.

(10) Patent No.: US 10,493,374 B2
(45) Date of Patent: Dec. 3, 2019

(54) SHORT-PATH DISTILLATION APPARATUS AND METHOD

(71) Applicant: Bizzybee LLC, Seattle, WA (US)

(72) Inventors: Levi Joseph Wells, Seattle, WA (US); Boris David Kogon, Seattle, WA (US)

(73) Assignee: Bizzybee LLC, Seattle, WA (US)

( * ) Notice: Subject to any disclaimer, the term of this patent is extended or adjusted under 35 U.S.C. 154(b) by 28 days.

(21) Appl. No.: 15/639,894

(22) Filed: Jun. 30, 2017

(65) Prior Publication Data
US 2018/0065060 A1    Mar. 8, 2018

Related U.S. Application Data

(60) Provisional application No. 62/383,997, filed on Sep. 6, 2016.

(51) Int. Cl.
| | |
|---|---|
| *B01D 3/12* | (2006.01) |
| *B01D 5/00* | (2006.01) |
| *B01D 3/02* | (2006.01) |

(52) U.S. Cl.
CPC ............. *B01D 3/12* (2013.01); *B01D 3/02* (2013.01); *B01D 5/0003* (2013.01); *B01D 5/006* (2013.01); *B01D 5/0012* (2013.01)

(58) Field of Classification Search
CPC .......... B01D 3/02; B01D 3/12; B01D 5/0003; B01D 5/0012; B01D 5/006
See application file for complete search history.

(56) References Cited

U.S. PATENT DOCUMENTS

| | | | | |
|---|---|---|---|---|
| 2,427,142 A | * | 9/1947 | Hornbacher | G01N 25/145 165/11.1 |
| 2,468,872 A | * | 5/1949 | Goldsbarry | B01D 3/4205 202/185.1 |
| 3,340,157 A | * | 9/1967 | Weiss | B01D 1/0017 202/176 |
| 3,393,133 A | * | 7/1968 | Baird | B01D 3/12 159/13.1 |

(Continued)

FOREIGN PATENT DOCUMENTS

| | | |
|---|---|---|
| CN | 102847333 | 1/2013 |
| RU | 2314147 C2 | 1/2008 |

OTHER PUBLICATIONS

International Search Report and Written Opinion of the International Searching Authority dated Dec. 28, 2017, in International Patent Application No. PCT/US2017/050346, 6 pages.

*Primary Examiner* — Jonathan Miller
(74) *Attorney, Agent, or Firm* — Benedict R. Dugan; Lowe Graham Jones PLLC

(57) ABSTRACT

A short-path distillation apparatus and method of operation are described. An example short-path distillation apparatus includes a double-walled bulb-shaped condensing head. The double wall forms a coolant chamber that substantially envelopes an inner condensate chamber. Coolant is introduced into and removed from the coolant chamber via ports in the outer wall of the head. Condensate in gaseous form is introduced into the condensate chamber where it comes in contact with and condenses as distillate upon the cold inner surface of the condensate chamber. Condensed distillate travels down the inner surface of the condensate chamber and then into a distillate outlet conduit that transports the condensed distillate to a collection vessel.

14 Claims, 10 Drawing Sheets

(56) References Cited

U.S. PATENT DOCUMENTS

| | | | | | |
|---|---|---|---|---|---|
| 3,395,083 | A | * | 7/1968 | Gilmont | B01L 3/569 |
| | | | | | 202/177 |
| 3,607,662 | A | * | 9/1971 | Glover | B01D 3/14 |
| | | | | | 202/160 |
| 3,907,683 | A | * | 9/1975 | Gilmont | B01B 1/08 |
| | | | | | 202/177 |
| 4,471,836 | A | * | 9/1984 | Hokanson | F28B 9/10 |
| | | | | | 165/111 |
| 5,164,049 | A | * | 11/1992 | Clark | B01D 1/02 |
| | | | | | 134/12 |
| 5,354,428 | A | * | 10/1994 | Clark | B01D 1/02 |
| | | | | | 159/DIG. 19 |
| 5,885,313 | A | * | 3/1999 | Okamoto | B01D 3/085 |
| | | | | | 165/110 |
| 6,419,796 | B1 | * | 7/2002 | Kitamura | B01D 3/14 |
| | | | | | 202/153 |
| 9,682,331 | B2 | * | 6/2017 | Kremerman | B01D 3/10 |
| 9,895,626 | B2 | * | 2/2018 | Kremerman | B01D 3/26 |
| 2015/0136158 | A1 | * | 5/2015 | Stevens | A24F 47/008 |
| | | | | | 131/329 |
| 2017/0003264 | A1 | * | 1/2017 | Adams | G01N 33/2823 |

\* cited by examiner

SHORT-PATH DISTILLATION APPARATUS AND METHOD

PRIORITY CLAIM

This application claims the benefit of U.S. Provisional Patent Application No. 62/383,997, entitled "SHORT-PATH DISTILLATION APPARATUS AND METHOD," filed on Sep. 6, 2016, the content of which is incorporated herein by reference in its entirety.

TECHNICAL FIELD

The present disclosure relates to a distillation apparatus, and more particularly a short-path distillation apparatus for phytochemical extraction.

BACKGROUND

Short-path distillation is a distillation technique that involves the distillate travelling a short distance, often only a few centimeters, and is normally done at reduced pressure. One example is distillation involving the distillate travelling from one glass bulb to another, without the need for a condenser separating the two chambers. This technique is often used for compounds which are unstable at high temperatures or to purify small amounts of compound. One advantage of short-path distillation is that the heating temperature can be considerably lower (at reduced pressure) than the boiling point of the liquid at standard pressure (e.g., 1 atm), and the distilland vapor only has to travel a short distance before condensing. A short path ensures that little compound is lost on the sides of the apparatus. (https://en.wikipedia.org/wiki/Short_path_distillation.)

FIG. 1 shows a prior art short-path distillation apparatus 1. The apparatus 1 includes a still pot 2, which holds a distilland 3. Heat is applied to still pot 2 to convert the distilland 3 into a gaseous (vapor) form. The apparatus 1 further includes a cold finger 4 upon which distillate condenses. The cold finger 4 is bent and pointed at its bottom portion to direct condensate towards a collection flask 5. The collection flask 5 collects distillate 6 that flows from the pointed bottom of the cold finger 4. The cold finger 4 is cooled via water flowing from inlet 7 to outlet 8. A substantial vacuum can be established via vacuum port 9.

DETAILED DESCRIPTION

Embodiments described herein provide devices and methods for short path distillation. An example inventive apparatus includes a double-walled bulb-shaped condensing head. The double wall forms a coolant chamber that substantially envelopes an inner condensate chamber. Coolant is introduced into and removed from the coolant chamber via ports in the outer wall of the head. Condensate in gaseous form is introduced into the condensate chamber where it comes in contact with and condenses as distillate upon the cold inner surface of the condensate chamber. Condensed distillate travels down the inner surface of the condensate chamber and then into a distillate outlet conduit that transports the condensed distillate to a collection vessel.

The described devices and methods can be used to separate various mixtures of liquids into their individual components. Some embodiments are used to separate THC (Tetrahydrocannabinol), CBD (Cannabidiol), terpenes or other materials from *cannabis* extract. The *cannabis* extract itself may be produced by running a solvent through plant material to strip out the desired materials, or by other techniques known in the art. Example systems and methods for solvent-based phytochemical extraction are described in U.S. patent application Ser. No. 15/339,816, entitled "PHYTOCHEMICAL EXTRACTION SYSTEMS, METHODS, AND DEVICES" and filed on Oct. 31, 2016, which is incorporated herein by reference in its entirety.

Figure 2:
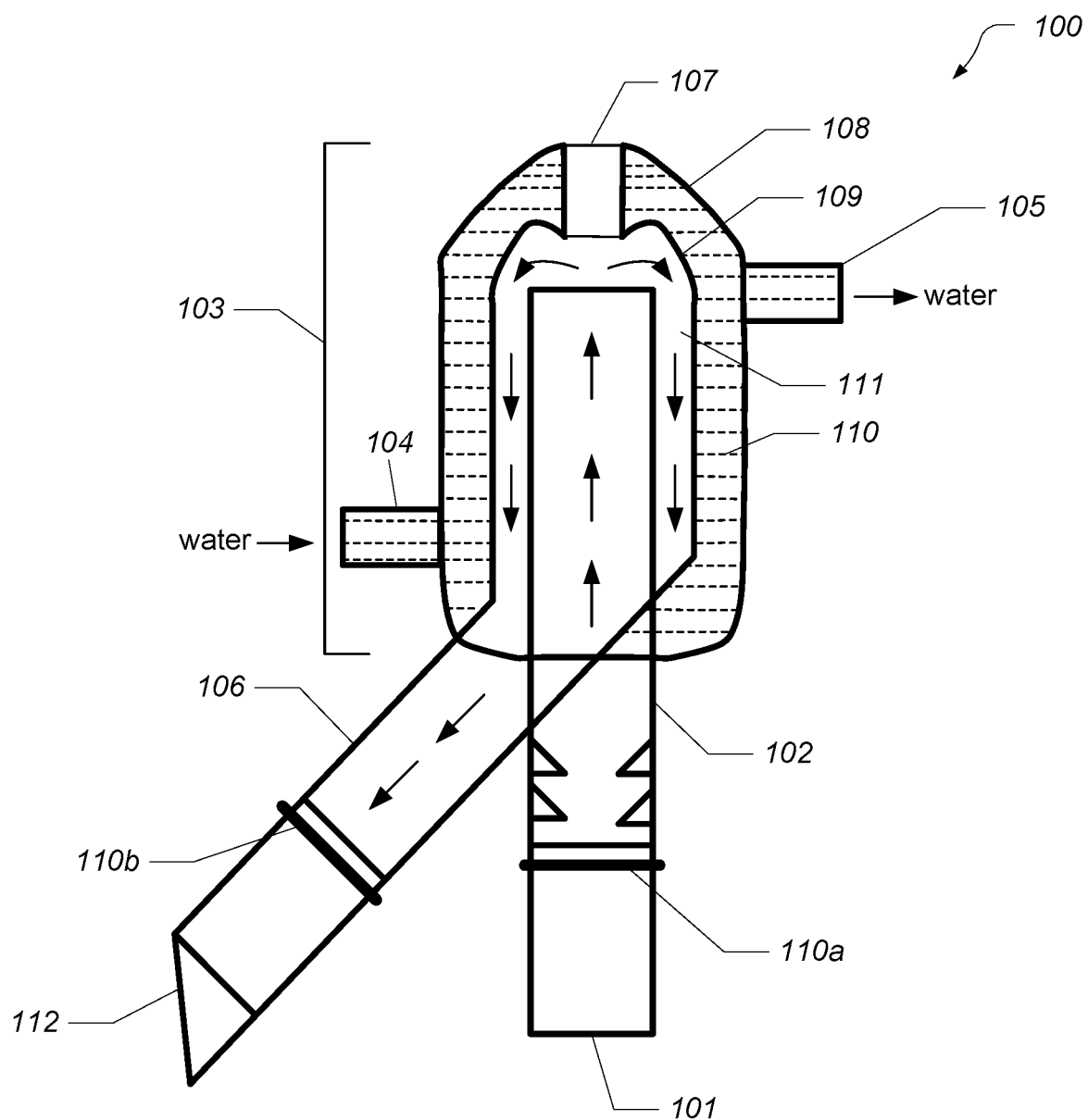
FIG. 2 is a cutaway drawing of a short-path distillation device according to a first embodiment.

FIG. 2 is a cutaway drawing of a short-path distillation device 100 according to a first embodiment. The device includes a distilland inlet conduit 102 and a distillate outlet conduit 106. The conduits are tubes or other hollow members configured to transport gas or liquid. Heated distilland vapor is produced by a still pot (not shown) or similar vessel that contains the distilland in liquid form. The vapor enters the inlet conduit 102 via an inlet port 101. The inlet conduit 102 operates as a fractionating column that creates a vaporization-condensation cycle that helps separate the distilland by facilitating the repeated cooling and subsequent vaporization of the distilland as it travels up the column.

The top of the inlet conduit 102 is substantially enveloped by a bulb-shaped condensing head 103. The head 103 is double-walled and has an outer sidewall 108 and a spaced apart inner sidewall 109 that defines a cooling fluid chamber 110 between the two sidewalls. The inner sidewall 109 is substantially configured as a surface of revolution about the inlet conduit 102, thereby defining a condensate chamber 111. The inlet conduit 102 is fluidly connected to the condensate chamber 111 for introduction of gaseous distilland into the condensate chamber 111.

The device 100 further includes a cooling fluid means for introducing and removing a cooling fluid (e.g., water) respectively to and from the cooling fluid chamber 110. In this embodiment, coolant is introduced into the chamber 110 via an inlet port 104 of the outer sidewall 108. Coolant is removed from the cooling fluid chamber 110 via an outlet port 105 of the outer sidewall 108. In some embodiments, the inlet port 104 is positioned below the outlet port 105. In other embodiments (e.g., FIGS. 4A and 6A), the inlet port is also lower than the outlet port but not vertically aligned. The ports are here shown as hollow cylinders protruding from the outer wall 108, so that they may be connected (e.g., by way of clamps or threads) to a hose or other conduit that carries coolant. In other embodiments, the ports may instead be flush with the outer wall, such as would be provided by a threaded hole in the outer wall.

As the vapor exits inlet conduit 102, it comes into contact with the cool inner surface of inner sidewall 109, where it condenses into distillate. The distillate travels down the inner surface of the inner sidewall 109 and into distillate outlet conduit 106, from where it can be captured in a collection vessel (not shown). The distillate outlet conduit 106 is fluidly connected to the condensate chamber 111 adjacent to the lower end thereof for receiving the liquid distillate from the condensate chamber.

The condensing head 103 also defines an aperture which forms a thermocouple inlet 107. The inlet 107 allows a thermometer or other probe to be inserted into the condensate chamber 111. The inlet 107 is preferably large enough to facilitate entry of distillation packing material. In the illustrated embodiment, the inlet 107 may be configured to receive a male 14/20 taper-ground connector. Once packing material is added to the chamber 111, a thermometer adapter (or similar) with a 14/20 joint may be inserted into the inlet 107.

The inlet port 101 at the bottom of the inlet conduit 102 may be provided using a 24/40 taper-ground joint. A similar joint may be located at the outlet port 112 at the bottom of the outlet conduit 106. Typically the joints at inlet port 101 and outlet port 112 will be the same dimensions (e.g., both 24/40 joints). Distillation device 100 also includes O-rings 110a and 110b. Each O-ring is a narrow ring seated in a circumferential indent groove around one of the conduits 102 and 106. The O-ring creates a tight seal with a conduit that mates the device 100 to a vapor source (e.g., still pot) or collection vessel.

Figure 1:
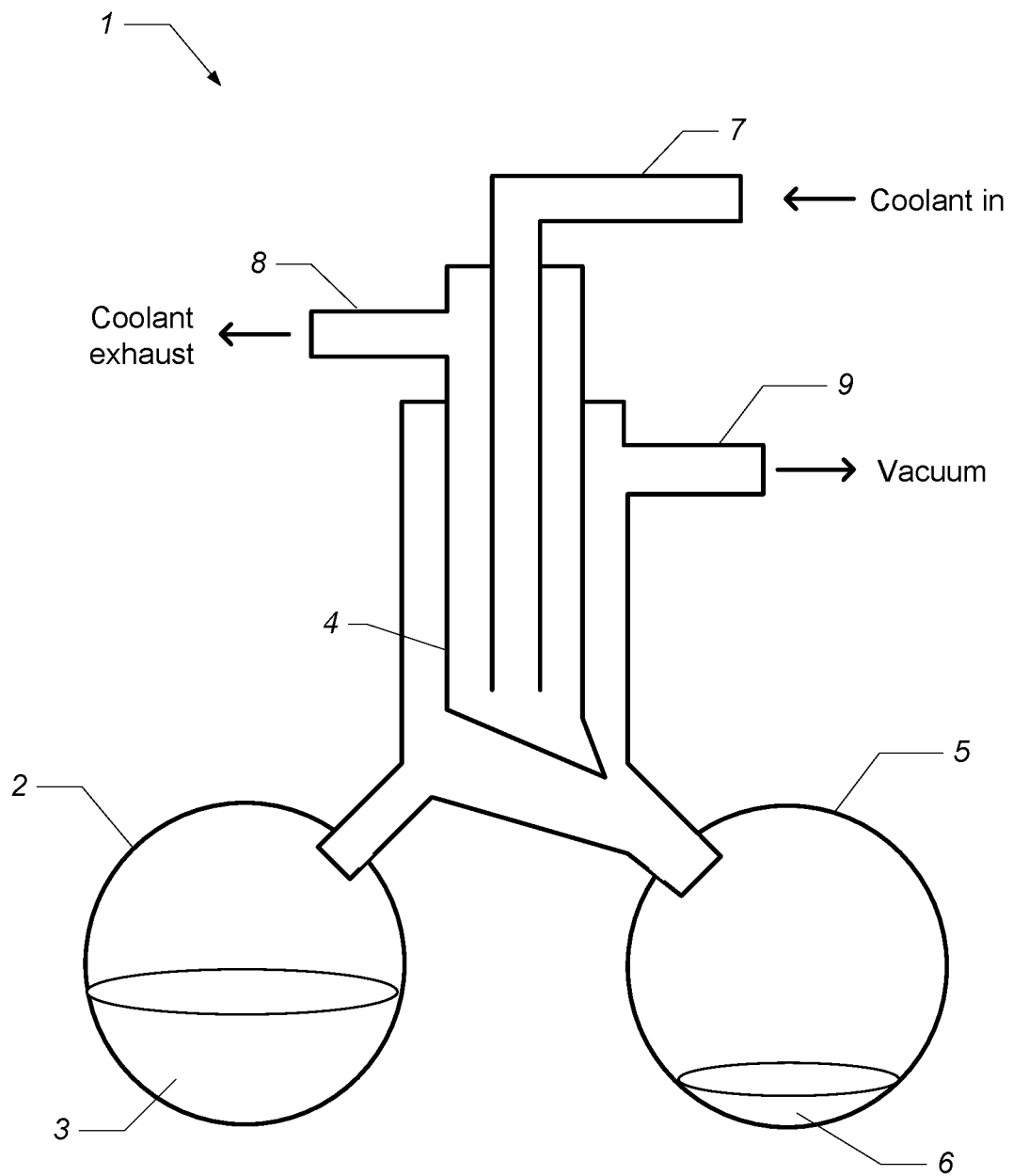
FIG. 1 shows a prior art short-path distillation apparatus.

The distillation device 100 and other embodiments shown and described herein provide a number of advantages over prior art devices. First, the described distillation devices provide substantially more surface area for condensing the distillate than prior art devices, such as that shown in FIG. 1. For example, the inner sidewall 109 of device 100 envelopes the distilland vapor with a cold surface. This configuration reverses that of prior art devices, which instead envelop a cold surface (e.g., the outer surface of a cold finger) with distilland vapor.

The described condenser design provides a full 360-degree contact area for condensate to form, thereby alleviating blockage and increasing productivity. The described condenser design also allows for the fractionating column (e.g., inlet conduit 102) to be insulated by the vacuum provided for the reaction. The benefit of this is that fractions will arrive sooner, while staying more consistent as they will not be susceptible to temperature fluctuations from environmental variables. The prior art short-path distillation head described with respect to FIG. 1 and others on the market currently suffer from this shortcoming.

Figure 3:
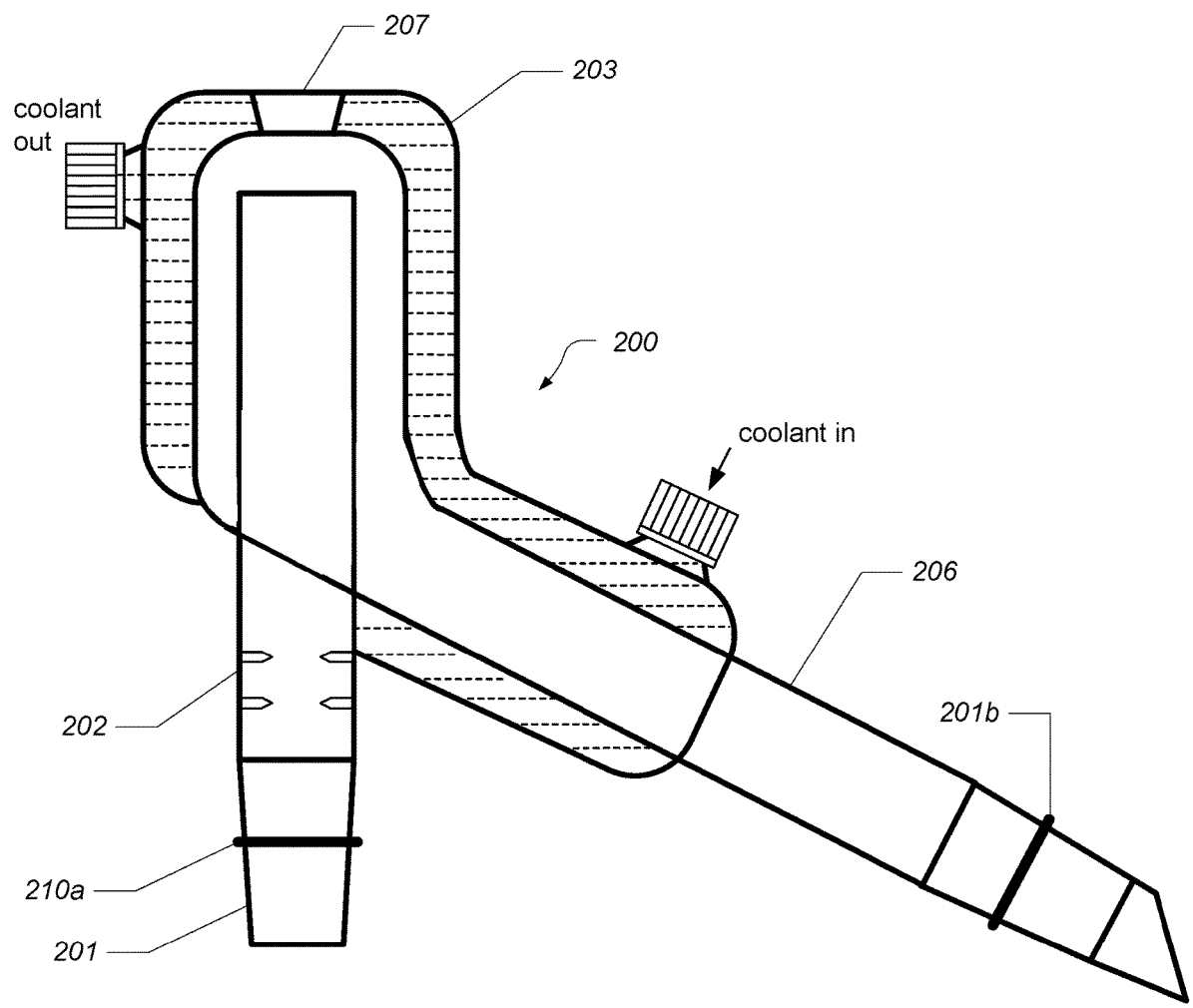
FIG. 3 is a cutaway drawing of a short-path distillation device according to a second embodiment.

FIG. 3 is a cutaway drawing of a short-path distillation device 200 according to a second embodiment. The device 200 differs from device 100 primarily in the configuration of the head 203. In particular, the head 203 substantially envelopes the top of the inlet conduit 202 as well as a portion of the outlet conduit 206. This configuration provides additional surface area for condensing distilland vapor.

In addition, the inlet conduit 202 includes a number of Vigreux indents. Vigreux indents are protrusions within the inner surface of the inlet conduit 202. These indents increase the surface area of the inner surface and thereby slow the rate at which hot vapors rise, thereby giving a better separation between the different components in the distillate in the inlet conduit 202.

Distillation device 200 also includes an inlet port 201 that includes a Glindemann-style O-ring 210a. The O-ring 210a is a narrow ring seated in a circumferential indent groove around the ground glass (or similar) inlet port 201. A similar O-ring 210b is found on the outlet port of the outlet conduit 206. The O-rings are typically manufactured from polytetrafluoroethylene ("PTFE"). These O-rings allow for a greaseless vacuum-tight seal, while also avoiding potential contaminants in the reaction vessel from vacuum grease or similar substance. Some embodiments utilize KALREZ® perfluoroelastomer O-rings supplied by DuPont Corporation.

The condensing head 203 also defines an aperture which forms a thermocouple inlet 207. The inlet 207 is configured and sized in a manner similar to inlet 107, described above.

The device 200 illustrates another advantage of the described design. The coolant in and out ports (e.g., ports 104 and 105 in FIG. 2) are formed using GL14 screw caps, which are safety screw adapters for barb-type fittings. This type of fitting provides advantages over prior art glass barbs, which are relatively fragile and represent a point of failure during connection and/or removal of coolant lines. Other embodiments may use different thread spacing, such as GL18, GL25, or the like.

Some embodiments are also configured to support digital data logging. A thermocouple adapter provides vacuum tight seal, eliminating the reliance on 10/30 and 10/18 joints used in the prior art devices. This allows the operator to observe fractions in real time via the reaction vapor temperature allowing for better control of the reaction.

Figure 4A:
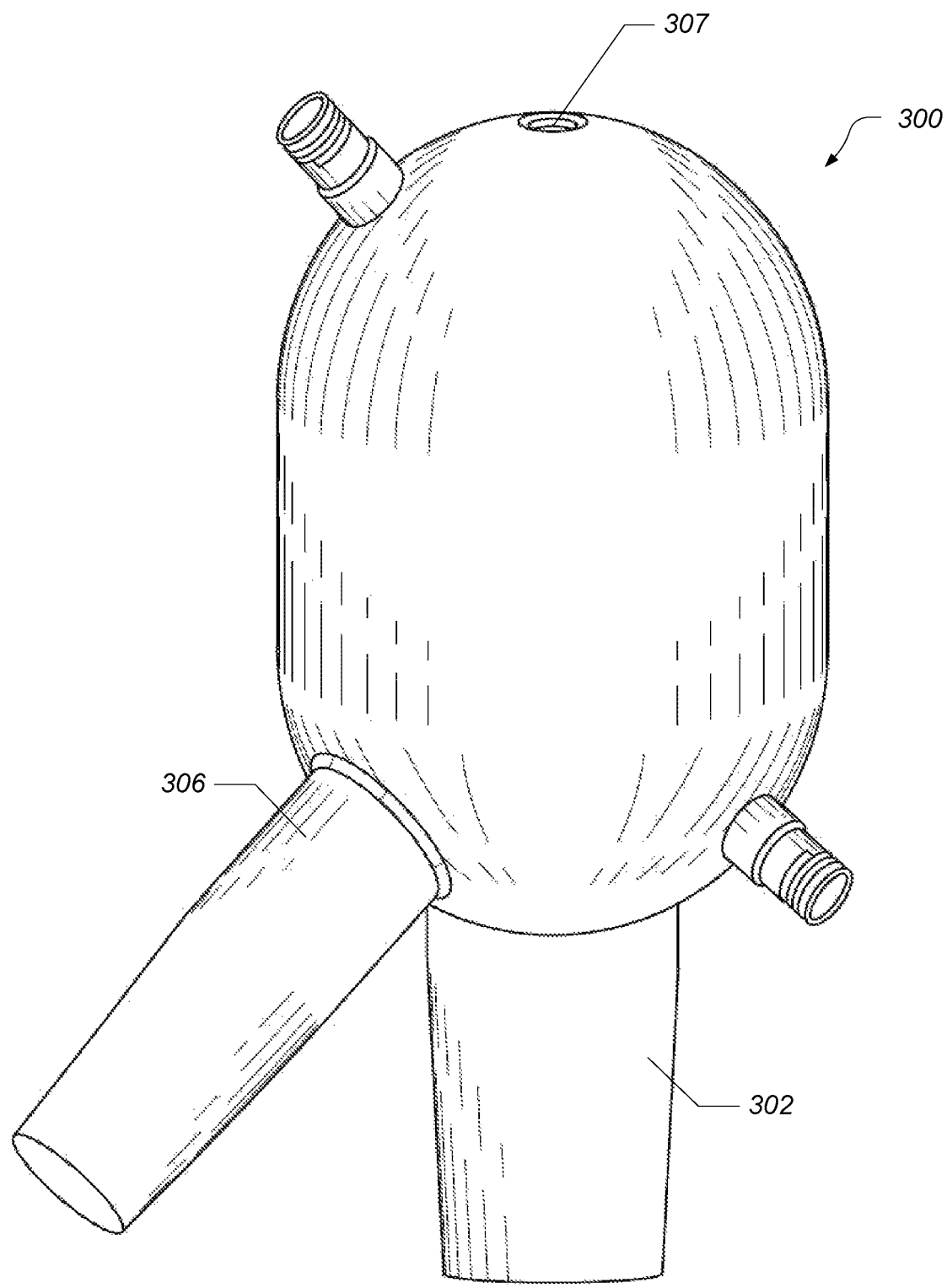
FIGS. 4A and 4B are three-dimensional renderings of a short-path distillation device according to a third embodiment.
Figure 4B:
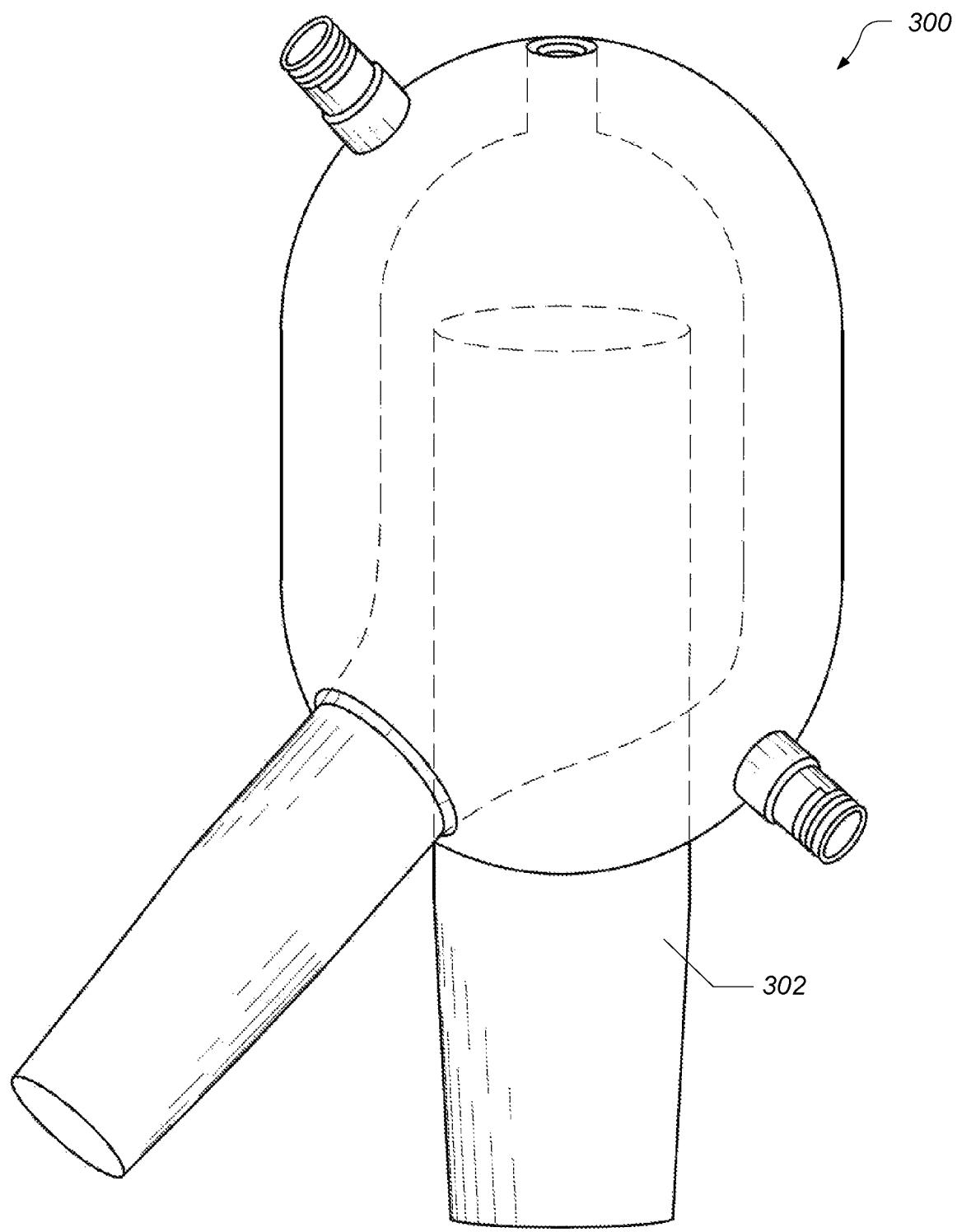

FIGS. 4A and 4B are three-dimensional renderings of a short-path distillation device 300 according to a third embodiment. Device 300 is substantially similar to device 100 except for the positioning of the coolant inlet and outlet ports. FIG. 4A shows surface features of the device 300, while FIG. 4B additionally shows interior structure via dashed lines.

In addition, although not shown in FIGS. 4A and 4B, the inlet conduit 302 and outlet conduit 306 include O-rings and are terminated with same-size (e.g., 24/40) ground glass joints, as discussed above with respect to FIGS. 2 and 3. Also, the thermocouple inlet 307 may in preferred embodiments be of a larger diameter than shown, such as via a 14/20 joint as discussed with respect to FIG. 2, above. In addition, in FIG. 4B the interior of the inlet conduit 302 may include Vigreux indents.

Figure 5:
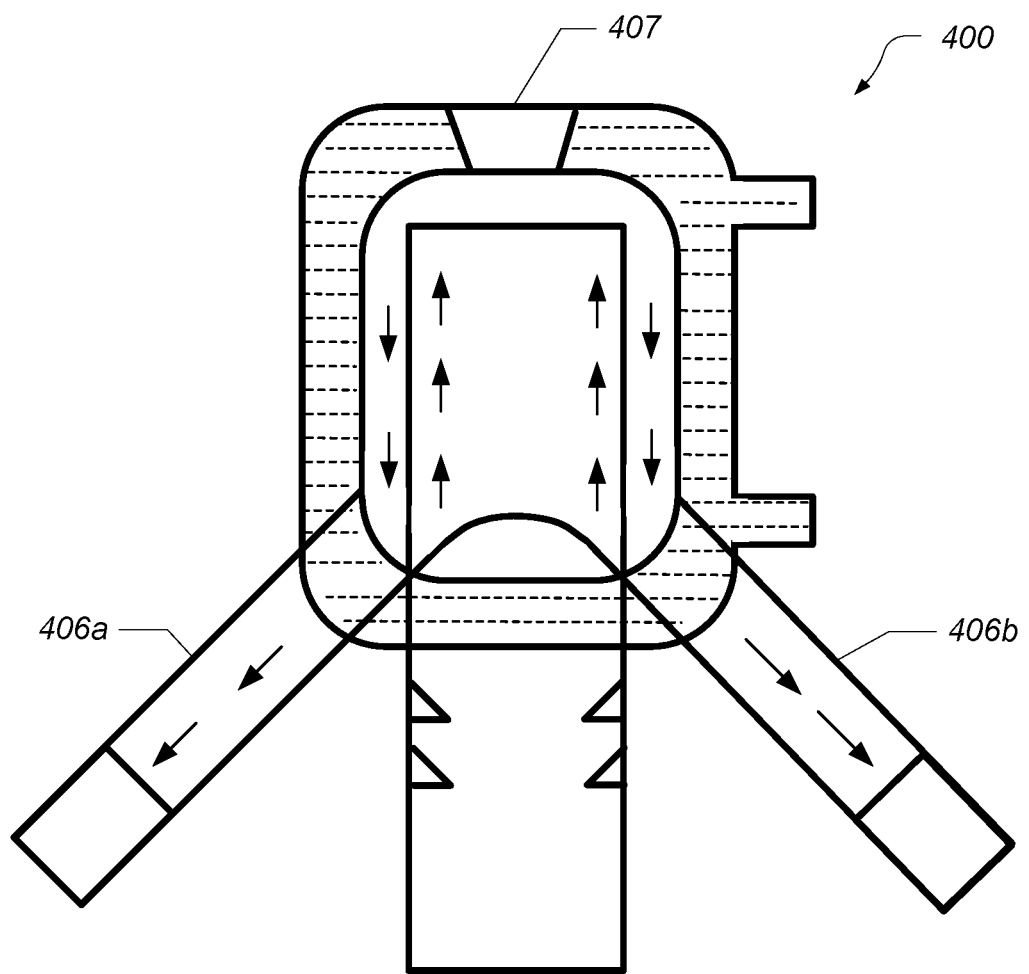
FIG. 5 is a cutaway drawing of a short-path distillation device according to a fourth embodiment.

FIG. 5 is a cutaway drawing of a short-path distillation device 400 according to a fourth embodiment. Device 400 differs from the above devices in that it includes two distillate outlet conduits 406a and 406b. Dual outlet conduits can increase the throughput of the device 400, resulting in shorter run times. The device 400 also includes a thermocouple inlet 407 that is typically larger (e.g., 24/40) than those discussed with respect to FIGS. 2 and 3, above.

Figure 6A:
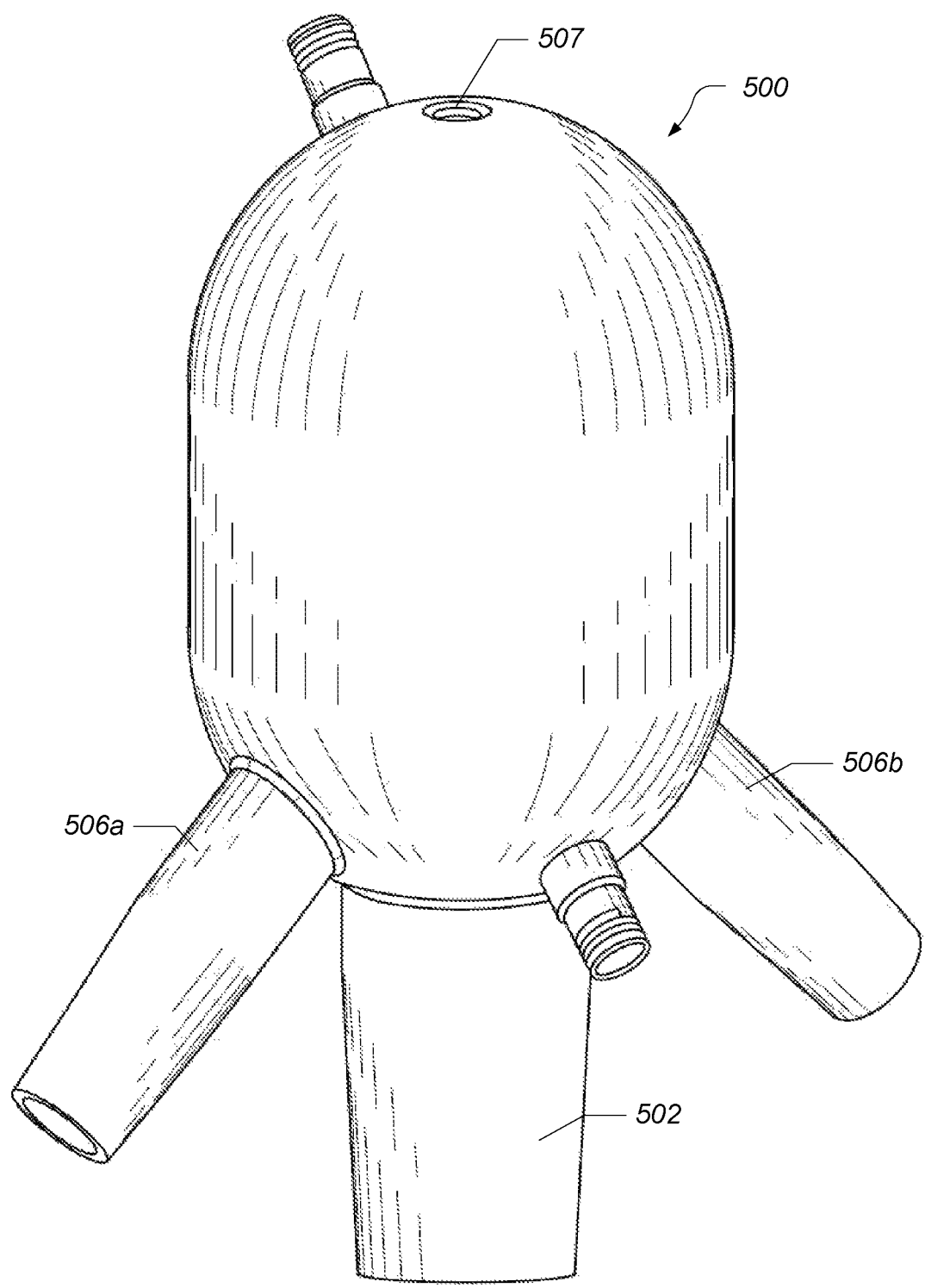
FIGS. 6A-6D are three-dimensional renderings of a short-path distillation device according to a fifth embodiment.
Figure 6B:
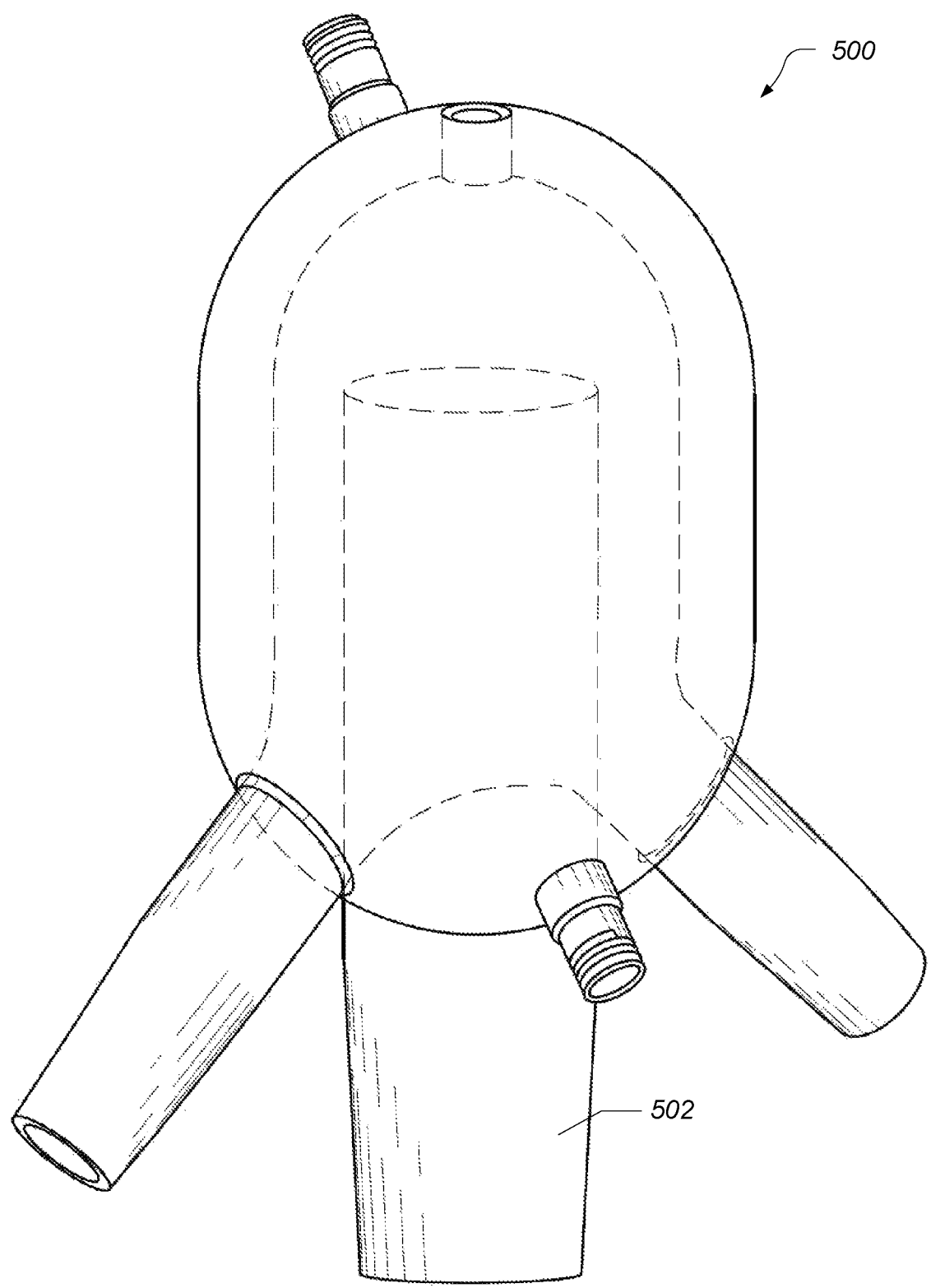
Figure 6C:
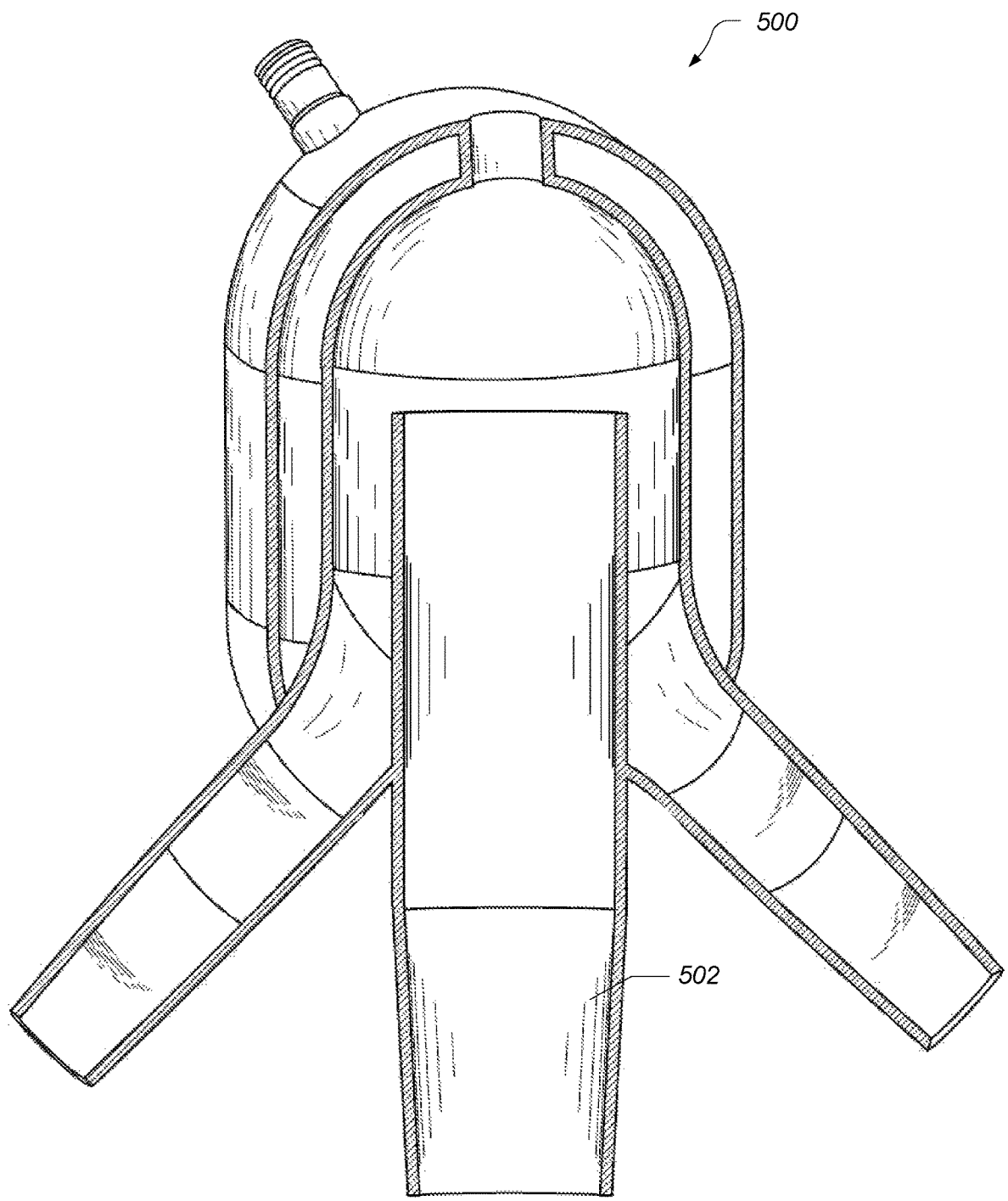
Figure 6D:
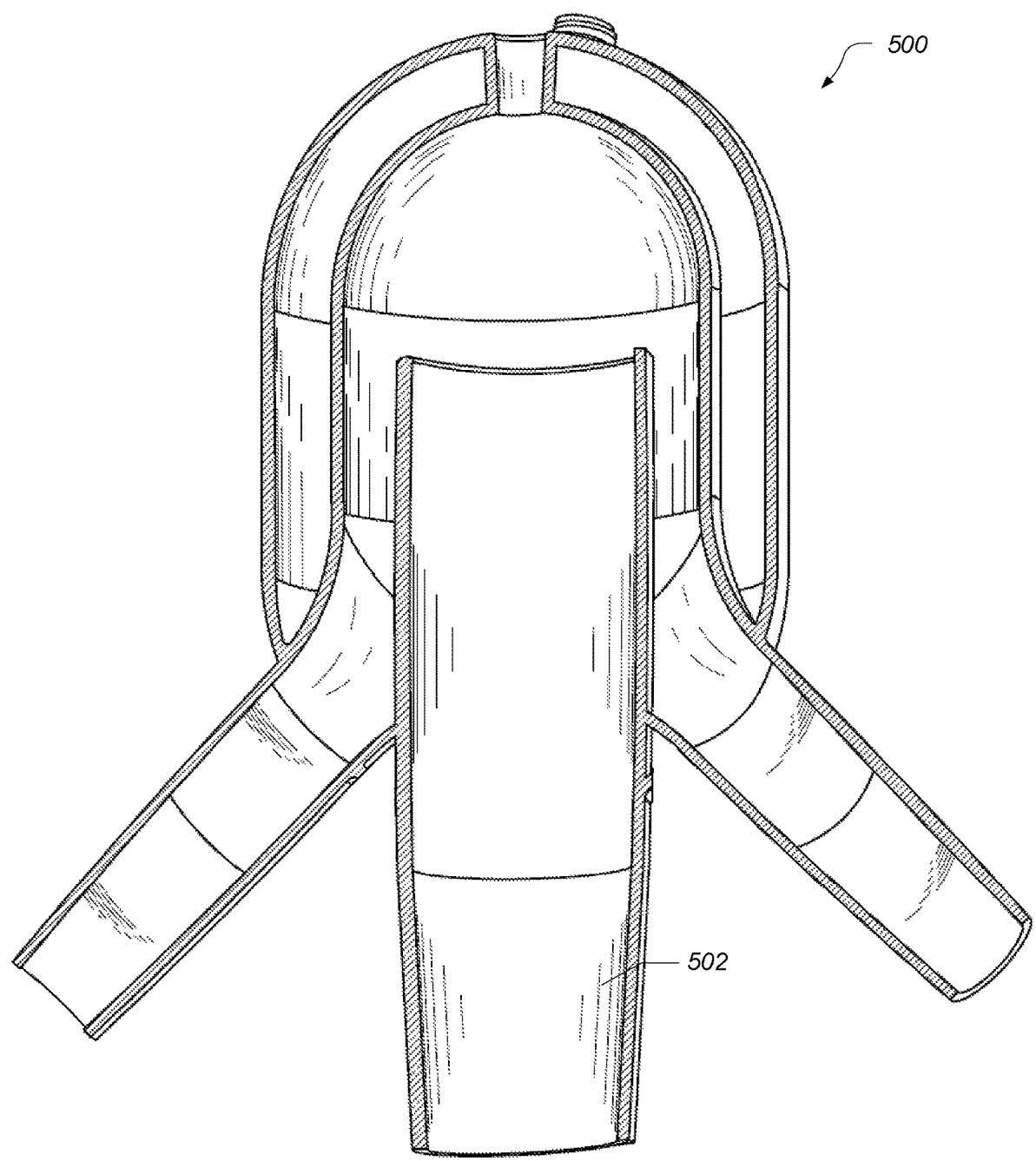

FIGS. 6A-6D are three-dimensional renderings of a short-path distillation device 500 according to a fifth embodiment. Device 500 is substantially similar to device 400 except for the positioning of the coolant inlet and outlet ports. FIG. 6A shows the surface features of the device 500. FIG. 6B shows interior features of the device 500 via dashed lines. FIGS. 6C and 6D are cutaways that show interior features of the device 500.

In addition, although not shown in FIGS. 6A-6D, the inlet conduit 502 and outlet conduits 506a and 506b include O-rings and are terminated with ground glass joints, as discussed above. Also, the thermocouple inlet 507 may in preferred embodiments be of a larger diameter than shown, such as via a 24/40 joint. In addition, not shown in FIGS. 6B, 6C, and 6D, the interior of the inlet conduit 502 may include Vigreux indents.

Some embodiments provide a process of distillation using the described devices. The process includes connecting (to the distillation apparatus) a still pot or other distilland vessel to the inlet conduit, connecting a collection vessel to the outlet conduit, connecting the coolant inlet port to a water source, and connecting the coolant outlet port to a drain or recovery vessel. A substantial vacuum or at least a reduced pressure condition (e.g., below 0.1, 0.05, 0.01, 0.001 atmospheres) is established within the condensation chamber by way of a vacuum pump or similar mechanism. The vacuum can be established by a user-connected vacuum take-off adapter, a cow-type distillation receiver, or the like. The distilland is heated to a desired temperature (e.g., the boiling point of desired fraction) thereby introducing vapor containing the faction into the condensation chamber, where it condenses into distillate. The distillate flows into the collection vessel via the outlet conduit.

Some embodiments provide a distillation apparatus, comprising a distillation head that has an inner wall and an outer wall, wherein the inner wall forms a condensation chamber that has an inner surface, wherein the outer wall envelopes the inner wall and forms a coolant chamber that surrounds the condensation chamber; a coolant inlet port on the outer wall that is configured to pass liquid coolant into the coolant chamber; a coolant outlet port on the outer wall that is configured to pass liquid coolant out of the coolant chamber; an inlet tube having a first end and a second end, wherein the tube passes through the inner and outer wall, wherein the first end is positioned within the condensation chamber, wherein the second end is positioned outside of the outer wall, and wherein at least a portion of the inlet tube protrudes into the condensation chamber; and an outlet tube having a first end and a second end, wherein the tube passes through the outer wall, wherein the first end forms an opening in the inner surface of the condensation chamber, and wherein the second end is positioned outside of the outer wall. The parts of the distillation apparatus are typically made of glass, although other substances such as metal can be used instead or in addition.

Distilland vapor from a still pot enters the condensation chamber via the first end of the inlet tube and condenses on the inner surface of the condensation chamber to form condensed distillate. The condensed distillate then flows out of the condensation chamber via the first end of the outlet tube.

In some embodiments, the first end of the outlet tube joins the inner surface of the condensation chamber, such that condensed distillate can flow unimpeded into the outlet tube and thence to a collection vessel.

While embodiments of the invention have been illustrated and described, as noted above, many changes can be made without departing from the spirit and scope of the invention. Accordingly, the scope of the invention is not limited by the above disclosure.

The invention claimed is:

1. A short path distillation apparatus, comprising:
a condensing head having a continuous outer sidewall and a spaced apart inner sidewall defining a cooling fluid chamber, the inner sidewall substantially configured as a surface of revolution defining a condensate chamber having an upper end and a distal lower end, wherein the cooling fluid chamber has an upper portion and a lower portion, wherein the upper portion is substantially configured as a first cylinder and the lower portion is substantially configured as a second cylinder, wherein central axes of the first and second cylinders are not parallel to one another;
a distilland inlet conduit fluidly connected to the condensate chamber for introduction of a gaseous distilland into the condensate chamber, wherein a portion of the distilland inlet conduit is enveloped by the upper portion of the cooling fluid chamber;
a distillate outlet conduit fluidly connected to the condensate chamber for receiving a liquid distillate from the condensate chamber, wherein a portion of the distillate outlet conduit is enveloped by the lower portion of the cooling fluid chamber;
a cooling fluid inlet port that is located on the outer sidewall at a bottom end of the lower portion of the cooling fluid chamber and that introduces coolant into the lower portion of the cooling fluid chamber, thereby cooling the inner sidewall; and
a cooling fluid outlet port that is located on the outer sidewall at a top end of the upper portion of the cooling fluid chamber and that removes spent coolant from the upper portion of the cooling fluid chamber, wherein the cooling fluid outlet port is positioned above the cooling fluid inlet port,
whereby introduction of a gaseous distilland into the condensate chamber through the inlet conduit results in condensation on the inner sidewall and deposition of the resulting distillate into the outlet conduit.

2. The distillation apparatus of claim 1, wherein the inlet conduit terminates adjacent to the upper end of the condensate chamber.

3. The distillation apparatus of claim 1, wherein the condensing head defines an aperture for insertion of a temperature probe.

4. The distillation apparatus of claim 1, wherein the inner sidewall, outer sidewall, inlet conduit, and outlet conduit are glass.

5. The distillation apparatus of claim 1, wherein the outlet conduit includes an inner end and an outer end, wherein the outlet conduit passes through the outer sidewall, and wherein the inner end joins the inner sidewall such that fluid can pass from the inner sidewall into the outlet conduit.

6. The distillation apparatus of claim 5, further comprising an O-ring that is positioned adjacent to the outer end of the outlet conduit and that circumscribes the outlet conduit.

7. The distillation apparatus of claim 1, wherein the inlet conduit includes an inner end and an outer end, wherein the inner end is positioned within the condensate chamber, and wherein the outer end is positioned outside of the condensing head.

8. The distillation apparatus of claim 7, further comprising an O-ring that is positioned adjacent to the outer end of the inlet conduit and that circumscribes the inlet conduit.

9. The distillation apparatus of claim 1, wherein the inlet conduit includes multiple Vigreux indents.

10. A short path distillation apparatus, comprising:
a condensing head having a continuous outer sidewall and a spaced apart inner sidewall defining a cooling fluid chamber, the inner sidewall substantially configured as a surface of revolution defining a condensate chamber having an upper end and a distal lower end, wherein the cooling fluid chamber has an upper portion and a lower portion, wherein the upper portion is substantially configured as a first cylinder and the lower portion is substantially configured as a second cylinder, wherein central axes of the first and second cylinders are not parallel to one another;
a distilland inlet conduit fluidly connected to the condensate chamber for introduction of a gaseous distilland into the condensate chamber, wherein a portion of the distilland inlet conduit is enveloped by the upper portion of the cooling fluid chamber;
a first distillate outlet conduit fluidly connected to the condensate chamber for receiving a liquid distillate from the condensate chamber, wherein a portion of the distillate outlet conduit is enveloped by the lower portion of the cooling fluid chamber; and means for introducing and removing a cooling fluid from the cooling fluid chamber, whereby introduction of a gaseous distilland into the condensate chamber through the inlet conduit results in condensation on the inner sidewall and deposition of the resulting distillate into the outlet conduit.

11. The distillation apparatus of claim 10, wherein the means for introducing and removing the cooling fluid includes a cooling fluid inlet port located on the lower portion of the cooling fluid chamber and a cooling fluid outlet port located on the upper portion of the cooling fluid chamber, wherein the cooling fluid inlet port is positioned below the cooling fluid outlet port.

12. The distillation apparatus of claim 11, wherein the cooling fluid inlet port and cooling fluid outlet ports each include a threaded fitting.

13. The distillation apparatus of claim 10, wherein the condensing head includes an opening adapted for the insertion of a temperature probe.

14. The distillation apparatus of claim 10, wherein the distilland inlet conduit and distillate outlet conduit each include a ground glass fitting and an O-ring.

* * * * *